United States Patent [19]

Kazami

[11] Patent Number: 5,794,161

[45] Date of Patent: Aug. 11, 1998

[54] SYSTEM FOR PROGRAMMING A SCANNING RADIO

[75] Inventor: Koichi Kazami, Tokyo, Japan

[73] Assignee: General Research of Electronics, Inc., Tokyo, Japan

[21] Appl. No.: 664,158

[22] Filed: Jun. 14, 1996

[51] Int. Cl.$^6$ .................. H04B 1/38; H04M 1/00

[52] U.S. Cl. .................. 455/557; 455/161.1; 455/186.1; 455/66

[58] Field of Search .................. 455/161.2, 185.1, 455/186.1, 186.2, 88, 89, 90, 66, 161.1, 31.14, 550, 556, 557, 575; 439/502, 669, 668; 340/825.03, 825.04, 825.22, 825.26, 825.27, 825.44

[56] References Cited

U.S. PATENT DOCUMENTS

| | | | |
|---|---|---|---|
| 4,103,452 | 8/1978 | Wood | 46/33 |
| 4,792,986 | 12/1988 | Garner et al. | 455/89 |
| 5,163,161 | 11/1992 | Bowles et al. | 455/164.1 |
| 5,337,290 | 8/1994 | Ventimiglia et al. | 368/10 |
| 5,600,311 | 2/1997 | Rice et al. | 340/825.19 |

Primary Examiner—Andrew I. Faile
Assistant Examiner—Christopher Onuaku
Attorney, Agent, or Firm—Trexler, Bushnell, Giangiorgi & Blackstone, Ltd.

[57] ABSTRACT

A system for externally setting reception frequency parameters of a radio scanner having a memory which is programmable according to data in the form of an electric pulse signal generated according to a protocol by a computer. The system includes a computer, a stereo phone plug connected to the RS-232 port of the computer, and a scanner stereo phone jack which can receive both of the stereo phone plug and a monaural ear-phone plug. The stereo phone plug has a common electrode, a first signal electrode and a second signal electrode. The second signal electrode carries the data from the computer to the scanner. The stereo phone jack has a common electrode, a first signal electrode and a second signal electrode. The common electrode, the first signal electrode and the second signal electrode of the stereo phone jack are adapted to be connected to the common electrode, the first electrode and the second signal electrode of the stereo phone plug, respectively, when the stereo phone plug is inserted into and connected to the stereo phone jack. A level converter circuit is provided between the computer and the scanner and is connected to the second signal electrode of the stereo phone jack for converting the signal level of the data from the second signal electrode and the common electrode of the stereo phone jack to the level of the electric pulse signal which is suitable to write the program to the memory of the scanner.

14 Claims, 2 Drawing Sheets

SYSTEM FOR PROGRAMMING A SCANNING RADIO

BACKGROUND OF THE INVENTION

The present invention presents a novel system for setting reception frequency parameters of a radio receiver. More particularly, the present invention relates to a novel system for externally setting reception frequency parameters of a radio receiver, such as a scanner, without the need for reception frequency parameter setting circuits within the scanner.

In a typical scanner, which can scan and receive a plurality of selected frequencies, the setting of the reception frequencies is usually performed within the physical structure of the scanner itself, requiring an additional circuit for programming the reception frequencies, in addition to a circuit for performing the primary receiver function of the scanner. As a result, the cost of such a scanner is necessarily increased by the additional circuitry required, further adding to an overall limitation in the desired miniaturization of the scanner configuration.

The present invention overcomes the shortcomings of the prior art by providing a novel system in which data for setting the reception frequency parameters of the scanner is inputted from an external data source into the scanner. This data is then written into a memory of the scanner providing operating reception frequency parameters to the scanner. Therefore, by utilizing this novel system, the need for the provision of such reception frequency parameter setting circuit within the scanner itself is eliminated. In addition, multiple or a large number of changes can be made (such as when the scanner is moved to a different geographical location) quickly and easily.

Another problem arises, however, pertaining to the connection device utilized for the electrical connection of the external data source to the scanner because an additional connector must be provided. This additional connector brings about a sacrifice for a degree of freedom in design relating to the outer casing of a miniaturized scanner, as well as necessity for special attention to the connection of the connector of the external data source to the connector of the scanner. This leads to an increase in production cost of the scanner.

In order to remedy the connection device problem, the novel system of the present invention utilizes a standardized stereo ear-phone plug connector which is inserted into a standardized ear-phone jack (usually monophonic) with which most miniaturized scanners are provided as standard equipment thereon. The standardized stereo ear-phone jack connector and plug provides an easy to use and simple connection between the external data source and the scanner without the need for any additional apparatus or special attention as to use. The standardized stereo ear-phone jack connector provides for simple insertion and connection to the scanner plug with no sacrifice of a degree of freedom in design for the outer case or configuration of the miniaturized scanner.

Furthermore, it is preferable to use a conventional personal computer, as means for externally setting the reception frequency parameters of the scanner, because no special apparatus need be developed in conjunction with the computer for that purpose.

The present invention allows for the desired overall miniaturization of the scanner's configuration, while simultaneously negating the need for the provision of reception frequency parameter setting circuits within the scanner. Additionally, the computer requires no special apparatus to be developed for use in conjunction with the system, resulting in a convenient, compact, easy to use miniaturized scanner at a lower cost.

OBJECTS AND SUMMARY OF THE INVENTION

A general object of the present invention is to provide a novel and improved radio receiver.

A more particular object is to provide a system for externally setting reception frequency parameters of the radio receiver.

A further object is to provide an efficient and compact electrical connection between an external data source and the radio receiver without sacrificing the degree of freedom relating to the radio receiver outer casing design.

Briefly, and in accordance with the foregoing, the present invention discloses a novel system for externally setting reception frequency parameters of a radio receiver, utilizing an external data source. The radio receiver can be a scanner with a memory having the ability to scan a plurality of frequencies set in the memory, while the external data source can be a personal computer. The scanner includes a standardized stereo ear-phone jack, which includes a first signal electrode, a second signal electrode and a common electrode, in which a standardized stereo ear-phone plug or a monaural ear-phone plug can be inserted. The present invention overcomes the shortcomings of the prior art in that it does not use an additional connector on the scanner case for data transmission from the external personal computer to the scanner.

The standardized ear-phone plug is connected between the external personal computer and the scanner. The ear-phone plug is connected to the RS-232 port of the computer and to the stereo jack provided in the scanner to supply data from the computer to the scanner for setting the reception frequency parameters. The system does not use an additional connector on the scanner case for data transmission from the external personal computer to the scanner.

The monaural phone plug is used to listen to the scanner using conventional ear-phones or ear plugs and is standard in configuration. The monaural phone plug includes a signal electrode and a common electrode. When the monaural phone plug is inserted into the jack, the signal electrode on the monaural phone plug connects to the first signal electrode in the stereo jack, and the common electrode on the monaural phone plug connects to the second electrode and the common electrode of the stereo jack. This supplies an audio output from the scanner through one channel (e.g. the "right" channel) of the stereo phone jack to the monaural phone plug.

The stereo phone plug is used to transmit data from the computer to the scanner to set the frequencies thereof. The stereo phone plug has a common electrode and first and second signal electrodes. The second signal electrode (i.e., the other or "left" channel) is used to transfer carry the data from the computer to the scanner.

When the stereo phone plug is inserted into the stereo phone jack, the first signal electrode of the stereo phone plug is connected to the first signal electrode of the stereo phone jack, the second signal electrode of the stereo phone plug is connected to the second signal electrode of the stereo phone jack, and the common electrode of the stereo phone plug is connected to the common electrode of the stereo phone jack.

A level converter circuit is provided between the computer and the scanner, and preferably in the scanner, and is connected to the second signal electrode of the stereo phone jack. The level converter circuit converts the signal level of the data between the second signal electrode of the stereo phone jack to the level of the electric pulse signal which is suitable to write the program to the memory of the radio receiver. Alternatively, the computer program could provide for such adjustment of the signal band, or a device connected between the computer and the scanner could be used.

Other features and advantages of the present invention will become more apparent from the following detailed description of the system, taken in conjunction with the accompanying drawings which illustrate, by way of example, the principles of the invention.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE PREFERRED EMBODIMENT

Figure 1:
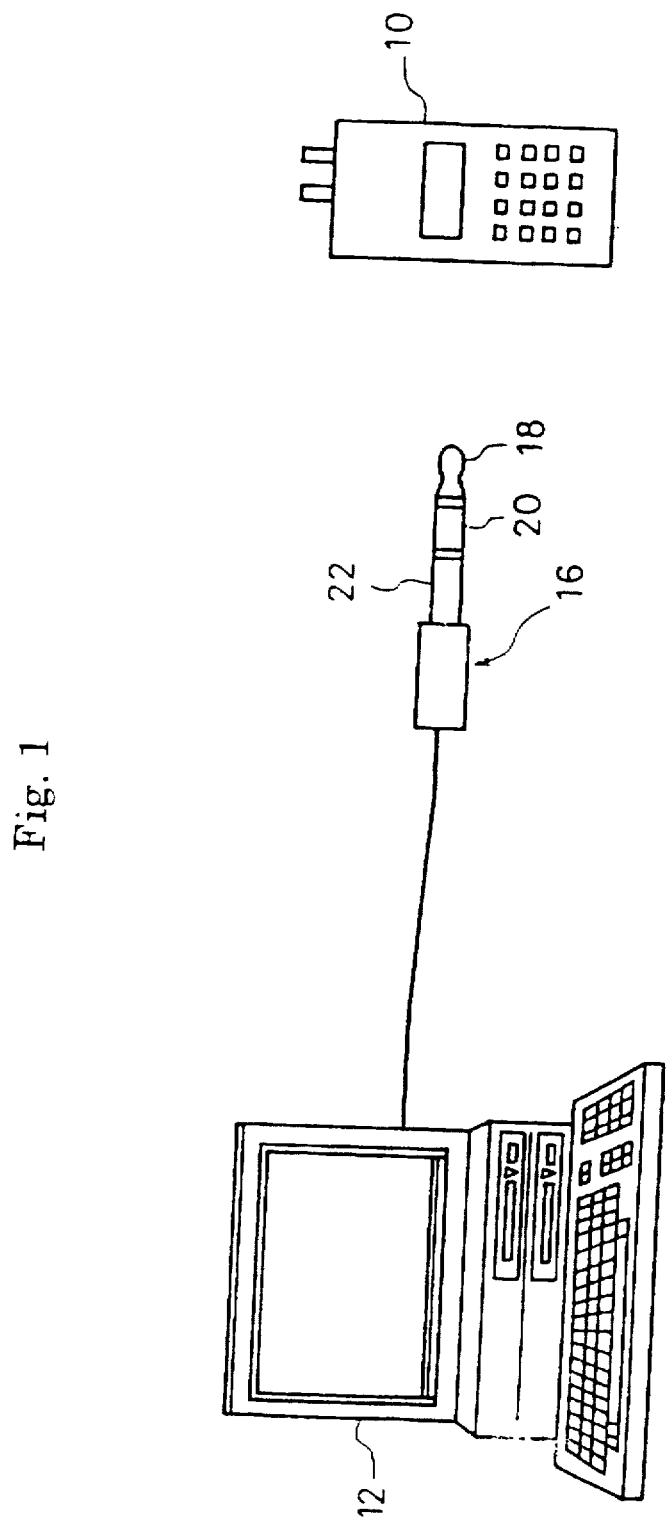
FIG. 1 shows a system of the present invention in which data relating to reception frequency parameters is transmitted from a personal computer to a scanner receiver through a standardized stereo phone plug.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as specifically illustrated and described herein.

The present invention relates to a novel system for externally setting the reception frequency parameters and the like of a radio receiver or scanner 10 utilizing an external data source, such as a personal computer 12. In accordance with this invention, FIG. 1 illustrates a system construction in which data for the setting of reception frequency parameters for the scanner 10 is supplied from the external personal computer 12 to the scanner 10. The personal computer 12 may be an IBM-PC/AT or AT compatible personal computer which runs under a general purpose operating system, such as DOS. The computer 12, as shown, usually includes a computer main body with a CPU, a hard disk and floppy disk drives, etc., as well as, a keyboard and a CRT display. The personal computer 12 also includes a serial data interface port, such as an RS-232 port, for receiving and transmitting data.

Figure 2:
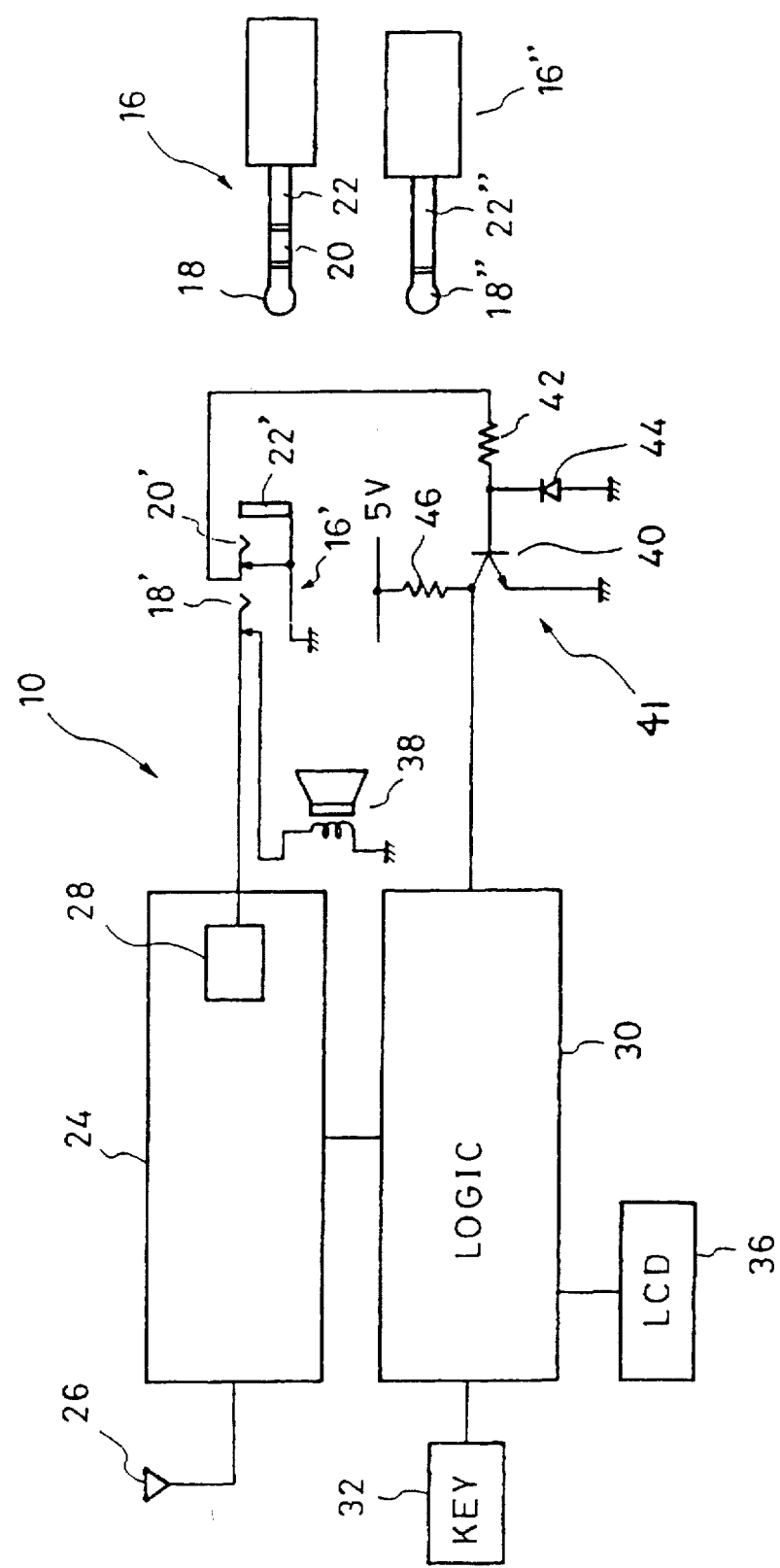
FIG. 2 is a schematic diagram of the scanner as shown in FIG. 1, as well as, the stereo phone plug shown in FIG. 1 and a monaural ear-phone plug for receiving an audio output from the scanner.

FIG. 2 shows a more detailed construction of the scanner 10. The scanner 10 includes a receiver circuit portion 24 connected to an antenna 26 and having an audio output circuit 28. The receiver circuit portion 24 is connected to a logic circuit portion 30 which is in turn connected to a keyboard 32 and a liquid-crystal display (LCD) 36. The scanner 10 is provided with a stereo phone jack 16' which can receive a standardized phone plug, which may be a stereo phone plug 16 or a monaural ear-phone plug 16".

The stereo phone jack 16' has a first signal electrode 18', a second signal electrode 20' and a common electrode 22'.

The first signal electrode 18' of the stereo phone jack 16' is connected to the scanner audio output circuit 28 and is selectively connected to an audio speaker 38 provided in the scanner 10. The second signal electrode 20' of the stereo phone jack 16' is coupled to a level converter circuit 41 provided between the computer and the scanner, and preferably in the scanner 10, and is selectively coupled to ground. The common electrode 22' is connected to ground.

The level converter circuit 41 includes a transistor 40 of which the base is connected through a resistor 42 to the second signal electrode 20' of the stereo phone jack 16'. A diode 44 is connected between the base and ground as shown in FIG. 2 to shunt any negative signals to the ground. The collector is coupled to a +5 volt source through a resistor 46 and to the input of the logic circuit portion 30. The voltage state of the collector of the transistor 40 of the level converter circuit 41 is transmitted to the logic circuit portion 30 as input data thereto.

The logic circuit portion 30 comprises a microcomputer which controls the operation of the receiver portion 24 in response to the key input from the keyboard 32 and supplies to the LCD display 36 a signal for causing it to display visual indications of the operation of the scanner 20. The logic circuit portion 30 provides various control signals to the receiver circuit portion 24, including a signal for activating circuits for scanner reception frequency bands, such as LOW, HIGH and UHF, respectively, a signal for controlling the scanner 10 in response to the kind of modulation of the scanner reception signal, a signal for controlling digitally the frequency of a receiver local oscillator circuit so that the scanner 10 can tune appropriately to the frequency to be received, a signal for controlling the scanning operation of the scanner 10, a signal for controlling the mute operation of the scanner 10, a signal for controlling the squelch operation of the scanner 10, etc.

The data signal from the level converter circuit 41 is provided for writing data to a computer memory, such as a programmable ROM of the micro-computer in the logic circuit portion 30, according to a conventional interface protocol between the personal computer 12 and the scanner 10. A specification for a program designed to run on the MICROSOFT® WINDOWS® 3.1 or 95, for example, could be used in the personal computer 12 to write data to the microcomputer memory in the scanner (MICROSOFT® and WINDOWS® are registered trademarks of Microsoft Corporation). The micro-computer controls the scanner receiver portion 24 so that it can operate selectively in response to the parameters relating to the received signal frequency. The contents which have been once written in the microcomputer memory are held until a writing program is carried out again.

The stereo phone plug 16 is connected to the RS-232 port provided on the personal computer 12 by a cable and to the stereo phone jack 16' provided in the scanner 10 in order to transmit data from the computer 12 to the scanner 10. As shown in FIGS. 1 and 2, the stereo phone plug 16 has a first signal electrode 18, a second signal electrode 20 and a common electrode 22 separated from each other by suitable insulating means. The data from the personal computer 12 is applied to the second signal electrode 20 and the common electrode 22 of the stereo plug 18, and more particularly TXD (transmit data) at the RS-232 port of the computer 12 is applied to the second signal electrode 20 of the stereo plug 16 and GRD (signal ground) at the RS-232 port of the computer 12 is coupled to the common electrode 22 of the stereo plug 16. The stereo phone plug 16 used in the present invention is preferably a standardized mini stereo phone plug.

When the stereo phone plug 16 is inserted into and connected to the stereo phone jack 16' provided in the scanner 10, the second signal electrode 20 of the stereo phone plug 16 which carries the TXD data from the computer 12 is connected to the second signal electrode 20' of the stereo phone jack 16', the first signal electrode 18 of the stereo phone plug 16 to which nothing is coupled is connected to the first signal electrode 18' of the stereo phone jack 16', and the common electrode 22 of the stereo phone plug 16 is connected to the common electrode 22' of the stereo phone jack 16'. The connection of the first signal electrode 18' of the stereo phone jack 16' to the first signal electrode 18 of the stereo phone plug 16 releases the connection of the scanner audio output amplifier 28 to the speaker 38. The connection of the second signal electrode 20' of the stereo phone jack 16' to the second signal electrode 20 of the stereo phone plug 16 releases the connection of the second signal electrode 20' of the stereo phone jack 16' to the ground. Therefore, when the stereo phone plug 16 is inserted into and connected to the stereo phone jack 16', the scanner audio output circuit 28 is separated in circuit connection from the audio speaker 38.

As described above, the TXD and GRD signals at the RS-232 port of the personal computer 12 are applied to the second and common electrodes 20 and 22 of the stereo phone plug 16, respectively. When the stereo phone plug 16 is connected to the stereo phone jack 16', the TXD signal on the second signal electrode 20 of the stereo phone plug 16 is applied through the second signal electrode 20' of the stereo phone jack 20' to the level converter circuit 41, and the GRD signal on the common electrode 22 of the stereo phone plug 16 is grounded through the common electrode 22' of the stereo phone jack 16'. The level converter circuit 41 converts the level and polarity of the voltage of the TXD signal (which is measured with respect to the GRD signal) to the level of 0–5 volts thereof, if such a conversion is necessary. For example, the TXD signal may have a voltage of plus or minus 12 volts when measured with respect to the GRD signal and is converted by the level converter circuit 41 to 0–5 volts. Therefore, the voltage state of the collector of the transistor 40 of the level converter circuit 41 is transmitted to the logic circuit portion 30 as input data thereto. Alternatively, the computer program could provide for such adjustment of the signal band, or a device connected between the computer and the scanner could be used.

The data signal from the level converter circuit 41 is provided for writing data to the computer memory, such as a programmable ROM of the micro-computer in the logic circuit 30, according to the interface protocol used. The micro-computer controls the scanner receiver portion 24 so that it can operate selectively in response to the parameters relating to the received signal frequency. The contents which have been once written in the microcomputer memory are held until a writing program is carried out again.

Normally, without the use of the novel system described herein, each frequency must be individually set and stored in the scanner 10 manually. To manually set and stored a frequency, the following steps are performed: (1) the MANUAL button is depressed and the desired channel number is entered by depressing the appropriate channel number button; (2) the PGM button (program button) is depressed which causes PGM to appear on the LCD display 36 to indicate that the scanner 10 is in the programming mode; (3) the frequency is entered by depressing the appropriate buttons; and (4) the L-OUT (lockout button) and/or ENT button (enter button) is depressed to store the frequency. Steps (1)–(4) are repeated to program each additional channel into the scanner memory. Other operations such as priority frequencies, search ranges, types of frequencies (e.g., police, fire, etc.), bandwidth, etc. may be programmed as well.

The system of the present invention eliminates the need to individually enter the channels which can become quite burdensome if the scanner 10 is moved to a different locale which has different frequencies for the desired information to be monitored. The desired frequencies to be entered into the scanner 10 can simply be entered by using the system of the present invention thereby greatly simplifying the process. In addition, the scanner 10 may be shipped from the factory with its memory empty, such that it is to be connected to a computer 12 and programmed by using the present novel system.

While it has been disclosed herein that the first electrode 18 of the stereo phone plug 18 is not connected to anything, it is envisioned that the first electrode 18 of the stereo phone plug 18, instead of being grounded, can be used to make the speaker 38 on the scanner 10 work. If this is to be done, the first electrode 18 of the stereo phone plug 18 is used to form a conductive link between the speaker 38 and the audio output circuit 28. Then, the computer 12 can be maintained in connection with the scanner 10 to continuously operate the scanner 10 for operations including, but not limited to, "trunking" radio operations.

The stereo phone jack 16' provided on the scanner 10 also accepts the monaural type ear-phone plug 16" therein to allow a user to listen to the scanner 10 by using conventional ear-phones or plugs connected to the monaural phone plug 16" by conventional means. The monaural phone plug 16" has a signal electrode 18" and a common electrode 22" which are separated from each other by suitable insulating means. When the monaural ear-phone plug 16" is inserted into and connected to the stereo phone jack 16', the signal electrode 18" of the monaural ear-phone plug 16" is connected to the first signal electrode 18' of the stereo phone jack 16', and the common electrode 22" of the ear-phone plug 16" is connected to the second and common electrodes 20' and 22' of the stereo phone plug 16'.

The connection of the first signal electrode 18' of the stereo phone jack 16' to the signal electrode 18" of the monaural ear-phone plug 16" releases the connection of the scanner audio output amplifier 28 to the speaker 38 and transmits an audio signal from the audio output circuit 28 in the scanner 10 to the first signal electrode 18' of the stereo phone jack 16' to the signal electrode 18" of the monaural plug 16" and finally to the ear-phones connected to the monaural phone plug 16". The connection of the second signal electrode 20' of the stereo phone jack 16' to the common electrode 22" of the monaural ear-phone plug 16" releases the connection of the second signal electrode 20' of the stereo phone jack 16' to the ground, however, the connection of the second signal electrode 20' of the stereo phone jack 16' to the ground is effectively maintained by the connection of the second and common electrodes 20', 22' of the phone jack 16' to the common electrode 20" of the monaural phone plug 16".

While a preferred embodiment of the present invention is shown and described, it is envisioned that those skilled in the art may devise various modifications of the present invention without departing from the spirit and scope of the appended claims.

The invention claimed is:

1. A system for externally setting reception frequency parameters of a radio scanner having a memory which is programmable according to data in the form of an electric pulse signal, said system comprising:

a computer for transmitting said data according to a preprogrammed protocol; and a stereo phone plug connected to said computer and having a common electrode, a first signal electrode and a second signal electrode, said second signal electrode and said common electrode carrying said data from said computer to write the program to said memory of said radio scanner; and a stereo phone jack provided on said radio scanner and adapted to receive said stereo phone plug, said stereo phone jack having a common electrode, a first signal electrode and a second signal electrode, said common electrode and said second signal electrode of said stereo phone jack being adapted to be connected to said common electrode and said second signal electrode of said stereo phone plug, respectively, when said stereo phone plug is inserted into and connected to said stereo phone jack, wherein said stereo jack provided on said radio scanner is further adapted to receive a monaural ear-phone plug, said monaural ear-phone plug having a common electrode and a signal electrode, said common electrode and said second signal electrode of said stereo phone jack being adapted to be connected to said common electrode of said monaural ear-phone plug and said first signal electrode of said stereo jack being adapted to be connected to said signal electrode of said monaural ear-phone plug when said monaural ear-phone plug is inserted into and connected to said stereo phone jack so that an audio output is supplied from said scanner through said stereo phone jack to said monaural ear-phone plug.

2. A system as defined in claim 1, further including a level converter circuit provided between said radio scanner and said computer, said level converter being connected to said second signal electrode of said stereo phone jack, said level converter circuit converting the signal level of said data between said second signal electrode and said common electrode of said stereo phone jack to the level of said electric pulse signal to write the program to said memory of said radio scanner.

3. A system as defined in claim 1, wherein said computer has a port which sends serially said data according to said preprogrammed protocol to said stereo phone plug, said stereo phone plug being connected to said port.

4. A system as defined in claim 1, wherein said stereo phone plug and said stereo phone jack are a standardized mini stereo phone plug and jack, respectively.

5. A system as defined in claim 1, wherein said radio scanner can scan a plurality of frequencies which have set.

6. In a radio scanner having a memory and being adapted to be programmed by and interconnected to a personal computer according to a preprogrammed protocol, an improved apparatus for facilitating the interconnection, comprising:

a stereo phone plug connected to said computer and having a common electrode, a first signal electrode and a second signal electrode, said second signal electrode and said common electrode carrying a data from said computer to write the program to said memory of said radio scanner; and a stereo phone jack provided on said radio scanner and adapted to receive said stereo phone plug, said stereo phone jack having a common electrode, a first signal electrode and a second signal electrode, said common electrode and said second signal electrode of said stereo phone jack being adapted to be connected to said common electrode and said second signal electrode of said stereo phone plug, respectively, when said stereo phone plug is inserted into and connected to said stereo phone jack, wherein said stereo jack provided on said radio scanner is further adapted to receive a monaural ear-phone plug, said monaural ear-phone plug having a common electrode and a signal electrode, said common electrode and said second signal electrode of said stereo phone jack being adapted to be connected to said common electrode of said monaural ear-phone plug, and said first signal electrode of said stereo jack being adapted to be connected to said signal electrode of said monaural ear-phone plug when said monaural ear-phone plug is inserted into and connected to said stereo phone jack, so that an audio output is supplied from said scanner through said stereo phone jack to said monaural ear-phone plug.

7. An improved apparatus as defined in claim 6, further including a level converter circuit provided between said radio scanner and said computer, said level converter being connected to said second signal electrode of said stereo phone jack, said level converter circuit converting the signal level of said data between said second signal electrode and said common electrode of said stereo phone jack to the level of said electric pulse signal to write the program to said memory of said radio scanner.

8. A system for externally setting reception frequency parameters of a radio scanner having a memory which is programmable according to data in the form of an electric pulse signal, said system comprising:

a computer for transmitting said data according to a preprogrammed protocol;

a stereo phone plug connected to said computer; and a stereo phone jack provided on said radio scanner and adapted to receive said stereo phone plug when said stereo phone plug is inserted into and connected to said stereo phone jack, said stereo phone jack further adapted to receive a monaural ear-phone plug so that an audio output is supplied from said scanner through said stereo phone jack to said monaural ear-phone plug.

9. A system as defined in claim 8, further including a level converter circuit provided between said radio scanner and said computer, said level converter being connected to said stereo phone jack, said level converter circuit converting the signal level of said data of said stereo phone jack to the level of said electric pulse signal to write the program to said memory of said radio scanner.

10. A system as defined in claim 8, wherein said computer has a port which sends serially said data according to said preprogrammed protocol to said stereo phone plug, said stereo phone plug being connected to said port.

11. A system as defined in claim 8, wherein said stereo phone plug and said stereo phone jack are a standardized mini stereo phone plug and jack, respectively.

12. A system as defined in claim 8, wherein said radio scanner can scan a plurality of frequencies which have set.

13. In a radio scanner having a memory and being adapted to be programmed by and interconnected to a personal computer according to a preprogrammed protocol, an improved apparatus for facilitating the interconnection, comprising:

a stereo phone plug connected to said computer and carrying data from said computer to write the program to said memory of said radio scanner; and a stereo phone jack provided on said radio scanner and adapted to receive said stereo phone plug, said stereo phone jack being adapted to be connected to said stereo phone plug when said stereo phone plug is inserted into and connected to said stereo phone jack, wherein said stereo jack provided on said radio scanner is further adapted to receive a monaural ear-phone plug, and said stereo phone jack being adapted to be connected to said monaural ear-phone plug when said monaural ear-phone plug is inserted into and connected to said stereo phone jack, so that an audio output is supplied from said scanner through said stereo phone jack to said monaural ear-phone plug.

14. An improved apparatus as defined in claim 13, further including a level converter circuit provided between said radio scanner and said computer, said level converter being connected to said stereo phone jack, said level converter circuit converting the signal level of said data of said stereo phone jack to the level of said electric pulse signal to write the program to said memory of said radio scanner.

* * * * *